April 4, 1944.   V. H. VAN SANT   2,345,641
GRID CONSTRUCTION
Filed April 7, 1942
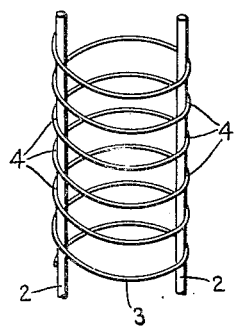
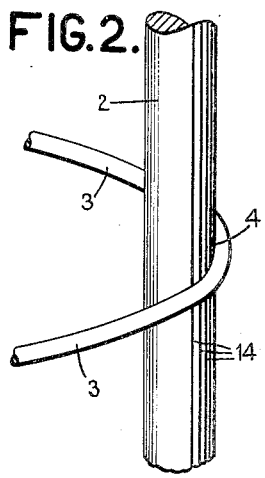
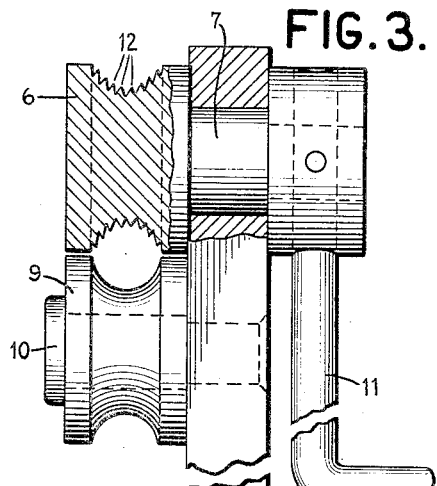
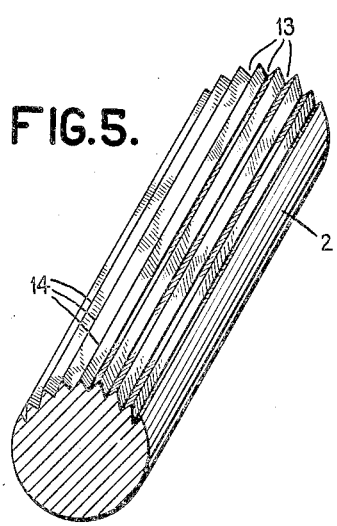
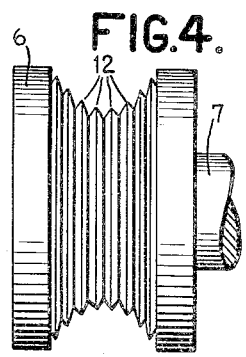
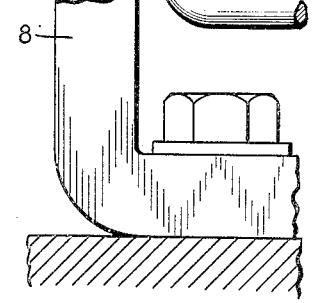
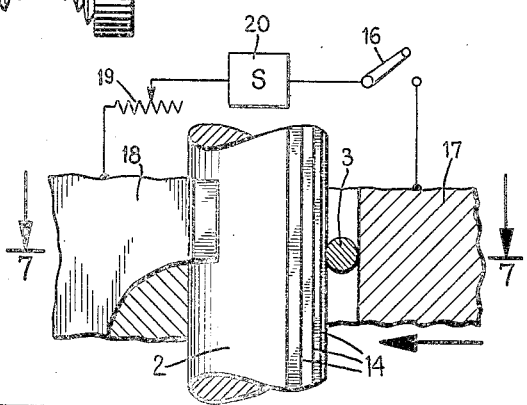
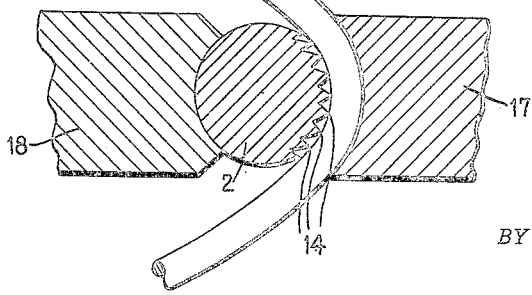
INVENTOR
VICTOR H. VAN SANT
BY
ATTORNEY Patented Apr. 4, 1944

2,345,641

UNITED STATES PATENT OFFICE 2,345,641

GRID CONSTRUCTION

Victor H. Van Sant, Westfield, N. J., assignor to Federal Telephone and Radio Corporation, a corporation of Delaware Application April 7, 1942, Serial No. 437,994

3 Claims. (Cl. 219—10)

This invention relates to the construction of a grid electrode for electric discharge devices, and particularly to the mounting of a grid wire on the support therefor.

An object of the present invention is to provide a simple, reliable and efficient method of constructing a grid for an electric discharge device, particularly when the grid consists of metal of high melting point.

Another object is to fix the position of a grid wire on its support in an improved and more reliable manner.

Heretofore, when grids have been constructed by welding the grid wire to its support wire, difficulties have been experienced in supplying and suitably controlling the precise amount of heat at the weld and in avoiding excessive or insufficient heat at the weld with consequent defects in the resulting grid. These difficulties are sometimes serious when the grid wire is very small relatively to the support wire, since the grid wire, on account of its higher resistance, tends to be excessively melted when the support wire reaches the proper temperature at the weld. Consequently the grid wire may be weakened, broken, dislocated, or deformed in the vicinity of the weld as a result of the excessive heat, or may be insecurely welded because of insufficient heat.

An object of the present invention is to overcome the above difficulties and to make it easier, more practicable to produce a suitable welding temperature when welding a relatively small grid wire to a grid support, and to avoid the usual excessive production of heat in the grid wire at the weld.

Another object is to produce a grid of improved strength and reliability of construction.

In accordance with one aspect of the present invention, a grid of improved strength and reliability of construction is produced by improving the method of mounting a grid wire on the support, therefor. The support of considerably larger diameter than the grid wire to be supported thereon, is prepared for welding by modifying the support at the place where the weld is to be produced, so that the desired welding heat is more efficiently produced and controlled, and is produced in more concentrated form in the desired part of the support, while excessive heating of the grid wire is avoided.

In another aspect, the invention provides a method of and means for increasing the electrical resistance of a grid support wire at the place of welding contact with a grid wire to be mounted thereon, without substantially increasing the resistance of the grid wire at the weld.

These and other objects and features of the invention will be understood more clearly in connection with the following detailed description and the accompanying drawing.

In the drawing, Fig. 1 is a perspective view of a grid to which the invention may be applied.

Fig. 2 is an enlarged fragmentary view, showing one of the junctions of the grid wire with the grid support in the Fig. 1 grid.

Fig. 3 is an elevation, showing a machine adapted to prepare a support wire in accordance with the present invention.

Fig. 4 is an elevation on an enlarged scale of an embossing or knurling roller adapted for use in the Fig. 3 machine.

Fig. 5 is an enlarged view of a section of a grid support wire prepared by the Fig. 3 machine.

Fig. 6 is a diagram showing a prepared grid support and a grid wire in connection with a welding circuit; and Fig. 7 is a section of the Fig. 6 arrangement taken on the line 7—7.

Referring to Fig. 1, the grid structure 1 for an electric discharge device consists of the two vertical grid support wires 2 of cylindrical form and ordinarily of metal of high melting point, as for example, molybdenum, tungsten, nickel, or other suitable metal. The grid wire 3, of considerably smaller diameter than the support wires 2, may be of the same material as support wire 2, and is wound as a helix around support wires 2, being welded thereto at the junctions 4, 4.

Fig. 3 shows a machine adapted to prepare a grid support wire for assembly with the grid wire. The cutting or embossing roller 6, fast to shaft 7 journalled in the stationary frame 8, cooperates with a companion roller 9 which is free to rotate on shaft 10 fast to frame 8, shaft 7 being provided with a crank 11 or other means for causing rotation thereof. Each roller 6, 9 has a working face with an arcuate contour and is so positioned that the companion rollers provide a substantially circular opening therebetween of such diameter that a grid support wire may be fed therethrough by rotation of shaft 7. The pressure of the rollers on the support wire is such that the closely spaced circumferential cutting edges 12 of V shaped profile, provided in the arcuate face of roller 6, are pressed or embossed into the grid support wire and emboss or knurl the wire on one side thereof, axially of the wire, as roller 6 rotates while feeding the wire between rollers 6 and 9. It will be seen that the resulting grooves 13, produced in the support wire 2, Fig. 5, are relatively close together and that the pressure of V shaped cutter edges 12 of the roller 6 produce an inverted V shaped ridge between any pair of adjacent grooves, and cause the ridges to taper down to knife-edge sharpness at the axial edges 14, the spacing between ridges 14 being small relatively to the diameter of grid wire 3.

When assembling a grid wire with its support wire, each junction 4 is produced in the manner shown in Fig. 6, wherein the grid wire 3 is brought into contact with the knife-edge ridges 14 of the support wire 2, the welding current is supplied from the source S by closure of the switch 16, closing a circuit from source S, 20 to the welding electrode 17 contacting with grid wire 3, the circuit passing from grid wire 3 through the sharp edges 14 of support wire 2, the current being led from the wire 2 through electrode 18 and rheostat 19, back to the source 20. Because of the reduced cross-sectional area of the welding current path at ridges 14 engaging in contacts with grid wire 3, rheostat 9 may be adjusted to furnish a much smaller welding current than is ordinarily required when the support wire 2 is of plain cylindrical form without ridges 14. As soon as the knife-edge ridges 14 are brought up to a suitable temperature, the ridges 14 quickly melt or soften to a sufficient degree to permit pressure applied to electrode 17, as indicated by the arrow in Fig. 6, to press grid wire 3 into closer engagement with support wire 2 thus completing the weld. Fig. 7 shows the relation of grid wire 3 to support wire 2 before applying the weld current thereto.

While the invention has been described in connection with a specific embodiment of the invention, it will be understood that various modifications thereof may be employed and that the grooves and ridges 14 may be applied to a support wire 2 by other means than the cutting roller 6 of Fig. 3. Furthermore, it will be understood that ridges 14 need not necessarily extend axially of the support wire, although that position of the ridges may be preferable in most cases. Other modifications will be apparent to those skilled in the art without departing from the invention as defined in the appended claims.

What is claimed is:

1. A method of forming a grid electrode structure for an electron discharge device, said structure including a grid wire and a support wire of substantially greater diameter than the grid wire, which comprises forming on a face of the support wire a plurality of laterally aligned projections, pressing the grid wire against said projections by means of opposed electrodes with the grid wire extending transversely to the support wire and in contact only with said projections on the support wire; passing between the electrodes a welding current passing between said support and grid wires and through said projections, sufficient to produce initial softening of the projections; pressing the grid wire into the softened projections to form a depressed grid wire seat; and terminating the welding operation before the outer portion of he grid wire in the zone of current passage is deformed.

2. A method as set forth in claim 1, in which the projections on the support wire are formed by passing the support wire between opposed rollers, one of said rollers having projection-forming corrugations.

3. A method as set forth in claim 1, in which longitudinal ridges constituting said projections are formed throughout the length of the support wire and on one side only thereof.

VICTOR H. VAN SANT.